United States Patent [19]

Frick

[11] Patent Number: 5,140,928

[45] Date of Patent: Aug. 25, 1992

[54] CONTROL SYSTEM FOR OUTRIGGER SPORT FISHING

[76] Inventor: David D. Frick, 2428 Harris Ave., Key West, Fla. 33040

[21] Appl. No.: 665,073

[22] Filed: Mar. 6, 1991

[51] Int. Cl.⁵ .............................................. B63B 35/14
[52] U.S. Cl. .................................... 114/255; 43/27.4; 248/514
[58] Field of Search ................. 114/255, 361; 43/21.2, 43/27.4; 248/512, 513, 538, 539, 540, 541; 212/229, 245

[56] References Cited

U.S. PATENT DOCUMENTS

| | | | |
|---|---|---|---|
| 2,727,707 | 12/1955 | Wells | 114/255 |
| 2,927,754 | 3/1960 | Davis | 248/514 |
| 3,724,791 | 4/1973 | Mason | 248/514 |
| 4,384,542 | 5/1983 | Wilson | 114/255 |
| 4,632,050 | 12/1986 | Rupp | 114/255 |
| 4,813,171 | 3/1989 | Cooper et al. | 43/27.4 |
| 4,875,428 | 10/1989 | Schlesch et al. | 114/255 |

*Primary Examiner*—Jesus D. Sotelo
*Attorney, Agent, or Firm*—Dennison, Meserole, Pollack & Scheiner

[57] ABSTRACT

A control system for outrigger sport fishing includes a highly maneuverable outrigger mounting mechanism attached to a portion of a boat on both the starboard and port sides. The movements of either outrigger mounting mechanisms are controlled through joysticks near a control console. The joysticks provide independent control for movement of each outrigger mechanism. The mechanisms are powered and operated by an electro-hydraulic control system which among other components includes an n-port solenoid operated manifold, a motor, pump and a reservoir for storage of the fluid. The operator controlled joystick providing an input signal representing the desired position of the pole. The controlled movement of the outrigger poles includes raising and lowering from positions parallel to the longitudinal axis of the keel and in directions pointing vertically perpendicular to the keel. Also, the controlled movement of the pole is to the stern of the boat, as well as outwardly from the axis of the boat to positions horizontally perpendicular thereto and transcribing points throughout.

18 Claims, 3 Drawing Sheets

CONTROL SYSTEM FOR OUTRIGGER SPORT FISHING

BACKGROUND OF THE INVENTION

This invention relates to a mounting unit for outriggers used for sport fishing. More specifically, the invention is a control system for moving an outrigger pole between positions fore and aft as well as in and out. The movement of the pole being selectively parallel or perpendicular to the deck of the boat and through angles between horizontal and vertical positions with respect to the keel of the boat.

Outriggers on sport fishing boats are primarily used to hold a fishing line in a position where the line may release once the fish takes the bait. The outrigger system functions to trail the fishing line from a position off to one side of the boat and well above the water line which allows a number of separate lines to be trolling astern of the boat. The outrigger is positioned above the water so that the bait in the water is not affected by the wake. Keeping the line away from the boat typically requires the use of a somewhat and cumbersome pole, usually called a trolling or outrigger pole, which is securely connected or mounted to the boat in a selected position and the movement of this pole to other positions can be manually controlled.

Various kinds of fishing outriggers for sport boats have been used in the past in order to minimize the amount of work the crew must perform to accommodate the fishermen, who are depending on the skill of the crew to physically position the outrigger pole for creating the most favorable conditions for taking game.

In U.S. Pat. No. 4,813,171, for example, the fishing outrigger device comprises a plate mounted on the side of the boat. A bracket of the plate includes a turntable which rotates. A pin passes through holes formed in the turntable and in the plate. The pin secures the turntable to the plate in a plurality of manually rotatable positions. In this way, the outrigger pole mounted by inserting into the device can be raised and lowered, in a plane perpendicular or parallel to the side of the boat to permit passage under a bridge.

U.S. Pat. No. 2,727,707, shows a pipe in which a trolling pole is inserted. An arc-shaped arm is movably engaged with the pipe. The device allows movement of the pole along the length of the arm so that when in contact with each other, the pole holder can be swung as a unit about a vertical axis.

In U.S. Pat. No. 4,384,542, making an outrigger device a part of the flying bridge accounts for movement of an outrigger pole about multiple axes through the use of a series of pivotally connected brackets. The brackets allow a tubular member to hold the outrigger pole and to be pivoted both upwardly and sidewardly when another hollowed tubular member is either moved to a folded position or opened to a functional position.

A worm gear drive, in U.S. Pat. No. 2,927,754, accounts for an ability of an operator to rotate a portion of a pole outwardly of a boat and move the pole along a line of an upwardly and outwardly inclined arc.

A mount shown in U.S. Pat. No. 3,724,791, includes a tubular socket for reception of a butt end of an outrigger pole. By pivotally mounting the socket on a bracket and using indexing and detent means operated by a spring-loaded handle, the outrigger pole may be selectively rotated to and locked in a raised or "stowed" position, extended for "fishing" positions, and a lowered position for passing under bridging or the like.

An outrigger system disclosed in U.S. Pat. No. 4,632,050 is principally concerned with relief of loads which the outrigger system on a sports fishing boat is traditionally expected to handle. This patent concerns itself with new forms of cable thrust outrigger masts which allow overloading to occur with only minimal damage to an outrigger mast and convenient replacement of any damaged member of the spreader assembly.

The outrigger devices exemplified in the patents referred to hereinabove illustrate the many improvements made over the years in simplifying and improving this aspect of sport fishing. There still exists, however, in this industry, a need for an outrigger control system which controls in a manner that particularly improves the safety, efficiency and economy of the outrigger pole, and to simplify installation, operation and maneuverability.

SUMMARY OF THE INVENTION

According to the present invention, a highly maneuverable outrigger mounting device is attached to a portion of the boat both on the starboard and port sides. Each of the outrigger poles may be independently controlled for movement. The outrigger pole can be raised and lowered from positions parallel to the longitudinal axis of the keel in directions pointing vertically perpendicular to the keel and pointing to the stern of the boat, as well as outwardly from the axis of the boat to positions horizontally perpendicular thereto and transcribing points throughout an arc which achieves an angle essentially between zero degrees and ninety degrees.

An operator controls the movements of either outrigger from joysticks or pushbutton control consoles which operate a control system having among other components a solenoid motor and a hydraulic pump. The movement of each outrigger from a position parallel to the axis of the keel in its lowered position to a position essentially vertically to the horizontal surface of the deck is achieved through the use of two hydraulic rams which are connected to and rotatable with a rotatable disc mechanism which operates the outrigger mounting pole between its fore and aft positions as well as in and out positions.

The rotatable disc mechanism is fluidly moved to positions throughout an angular period at which one desires to extend the outrigger pole from which trolling for fish will commence. The entire operation is conveniently controlled by the operator from a single position on the bridge or control console, thereby entirely eliminating the necessity of any manual intervention, such as in the prior art, for either rotating the outrigger pole to fore and aft positions with respect to the keel and thereupon extending the outrigger pole outwardly of the boat to a position in which all parties are satisfied that the optimum position of the outrigger pole has been located.

Accordingly, an object of the invention is to improve the outrigger apparatus for the controlling of the position of the mount or tube in which the outrigger pole of a sports fishing boat is mounted.

Another object of the invention is to maneuver the outrigger pole into positions which require no intervention by members of the crew of the boat or those members which are engaging in the sport of fishing.

A further object of the invention is to raise and lower the outrigger pole of a sports fishing boat between fore and aft positions and to all points in between the fore and aft positions locations which are essentially parallel as well as perpendicular to the longitudinal axis of the boat.

Yet another feature of the invention is the novel use of the control system to effectively "jig" the bait which is being controlled by the lines which extend between the chair occupied by the fisherman and the distal end of the outrigger pole.

Still another feature characterizing the present invention is the development of a control system which relies on electro-hydraulic elements through which movement of the mount for the outrigger pole is achieved in a smooth and expeditious manner with no doubt in the mind of the operator that the drive system is responding exactly in the manner under which the maneuvering is desired.

A further feature of the invention is a control system for maneuvering the outrigger pole on a sports fishing boat which depends on conventionally manufactured elements incorporated into the electro-hydraulic design, thereby minimizing the expense and improving the economy of a fully installed system.

Other objects of the invention will become apparent from the following description of a preferred embodiment of the present invention taken in conjunction with the accompanying drawings.

DESCRIPTION OF A PREFERRED EMBODIMENT

Figure 1:
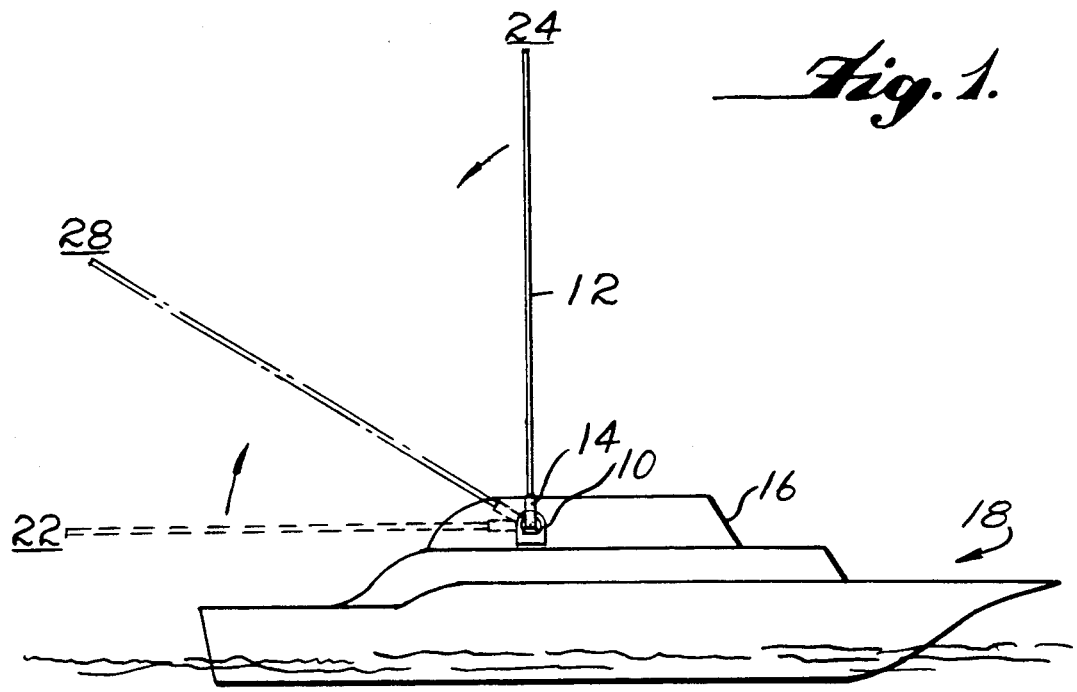
FIG. 1 is a side elevation of the fore and aft positions of general movement for the outrigger pole in accordance with the present invention.
Figure 2:
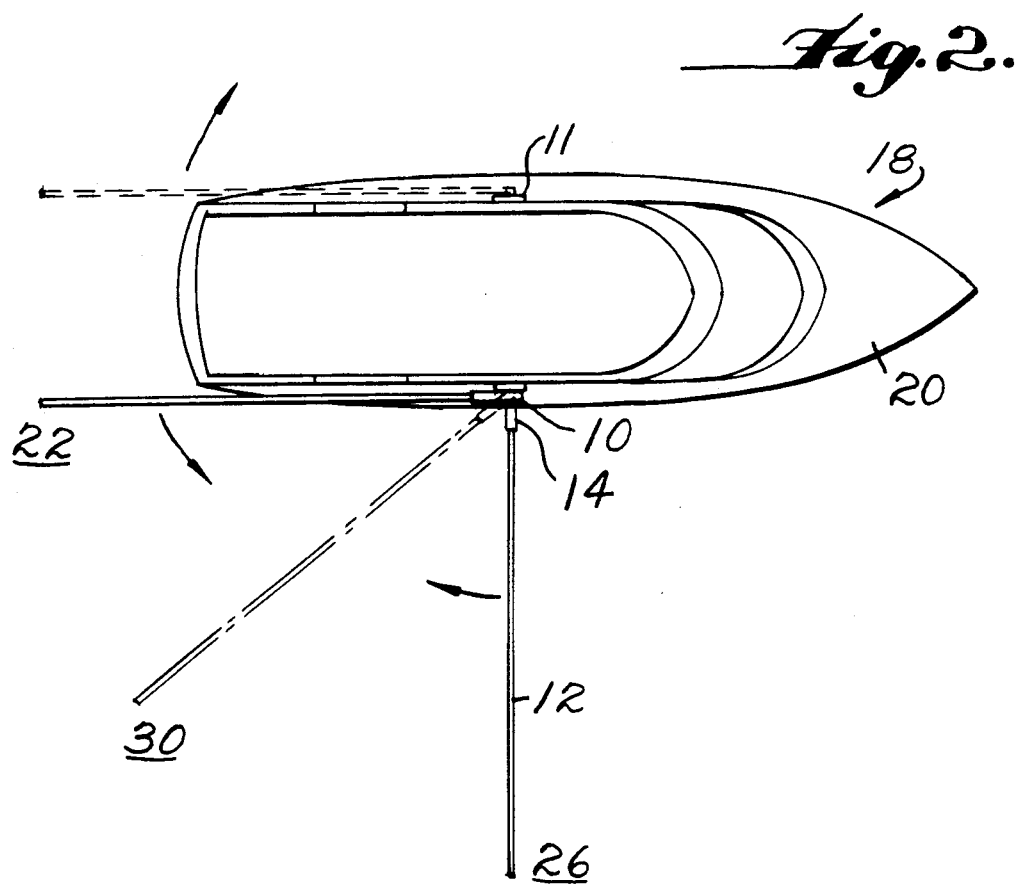
FIG. 2 is a top plan view of the boat and illustrates the in and out positions of general movement for the outrigger pole as controlled by the present invention.

FIGS. 1 and 2 illustrate two identical outrigger rotating disc mechanisms 10, 11 mounted to the starboard and port sides of a boat 18. Because the mechanism 10, 11 are identical, from hereinafter, the details of the starboard side mechanism 10 are described until so noted.

The outrigger rotating disc mechanism 10 directly moves outrigger pole 12. The movement is arcuate with the point of pivot being around the mechanism 10. The pole 12 is snugly inserted into a hollow tubular mounting insert 14. The tubular mounting insert 14 is pivotally connected to the rotating disc mechanism 10 which is fixedly attached to the bridge or other super structure 16 of boat 18. Accordingly, because the pole 12 is pivotally mounted to the mechanism 10 which is fixedly mounted to the boat 18, the movement of the pole 12 is somewhat arcuate.

To facilitate the understanding of the many movements of pole 12, two reference features are utilized. Deck 20 defines a horizontal plane and keel 21 defines a longitudinal axis. The rotating disc mechanism 10 moves outrigger pole 12 from one boundary or stowed position 22 to either of two other boundary positions 24, 26. Such movement, through and to these positions, is now described with respect to the horizontal plane or deck 20 and longitudinal axis or keel 21 of the boat 18.

In the fully stowed position 22, the rotating disc mechanism 10 rotates the connected tubular insert 14 and thus the outrigger pole 12 aft or toward the stern of the boat 18. The pole 12 is now in parallel with the longitudinal axis or keel 21 of the boat 18. Also, the pole 12 is in parallel with the horizontal plane defined by the deck 20 of the boat 18.

From the fully stowed position 22, as shown in FIG. 1, the pole 12 is rotated by mechanism 10 from the aft or stowed position 22 to the fore or complete vertical position 24. In the vertical position 24, the outrigger pole 12 is perpendicular to longitudinal axis or keel 21 of the boat 18.

Furthermore, in this complete vertical position 24, the pole 12 is perpendicular to the horizontal plane defined by the deck 20. This plane, formed between the fully stowed position 22 and the complete vertical position 24, is vertical to the horizontal plane defined by the deck 20. Also, the arcuate movement of the pole 12 from the stowed position 22 to the vertical position 24 forms a right or ninety degree angle, when the pole 12 is in this vertical position 24, with respect to the deck 20. Of course, the rotating disc mechanism 10 can move the outrigger pole 12 to any position within this ninety degree arc, as generally indicated by position 28.

With respect to FIG. 2, the rotating disc mechanism 10 can move the outrigger pole 12 from the fully stowed position 22 to the horizontal or fully extended position 26. Alternatively, the rotating disc mechanism 10 will move the pole 12 from the complete vertical position 24 to the horizontal or fully extended position 26. Accordingly, as now so described, the mechanism 10 can move the pole 12 from one of the positions to either of the other two, as well as points therebetween.

In the fully extended position 26, the pole 12 is perpendicular to the longitudinal axis or keel 21 of the boat 18. However, the pole 12 is now parallel to the horizontal plane defined by the deck 20. When the pole 12 is directly moved from the complete vertical position 24 to the fully extended position 26, the pole 12 travels in a plane which is vertical or at a right angle to the longitudinal axis defined by the keel 21 of the boat 18. Alternatively, as the pole 12 is directly moved from the stowed position 22 to the extended position 26, the pole 12 remains parallel to the horizontal plane defined by the deck 20.

As can be appreciated, positions 22, 24, and 26 form the boundaries of three planes and rotating disc mechanism 10 can move outrigger pole 12 to any position between the two described vertical planes as well as the horizontal plane with such positions generally indicated by numeral 28 in FIG. 1 and numeral 30 in FIG. 2.

With respect to FIGS. 3-6, the details of rotating disc mechanism 10 are shown. The mechanism 10 is an inverted U-shaped device having a face plate 32 which includes a circular cut-out or aperture 34. Cut-out 34 is centrally positioned within face plate 32 and its center axis is the axis of rotation for the device 10.

Figure 5:
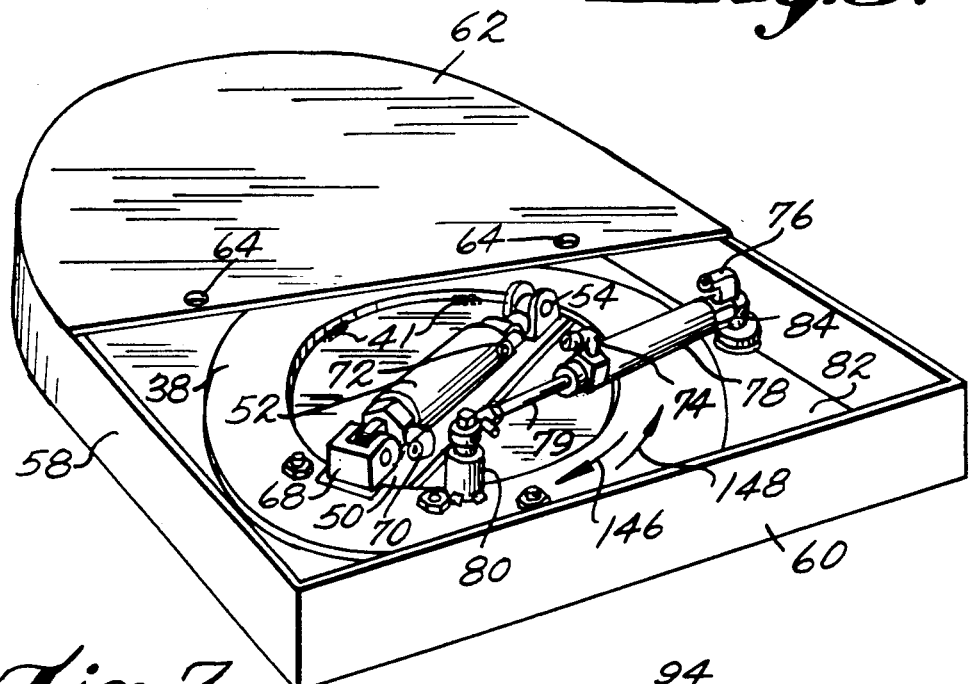
FIG. 5 is a rear perspective view of the rotating disc mechanism of the invention.

Positioned on either side of the circular cut-out 34, so as to sandwich the circular aperture 34 therebetween, are slightly larger rotating disc members. Outer disc member 36 is sufficiently larger than aperture 34. The disc member 36 covers the aperture 34 and is axially aligned with the aperture. The other disc member is shown in FIG. 5. It is ring-shaped member 38 and it is also axially aligned with aperture 34 of face plate 32. Disc member 36 and ring-shaped member 38 are fastened together by way of equally spaced apart through bolts 40. A weld 41 is also used for added securing.

Figures 3, 4:
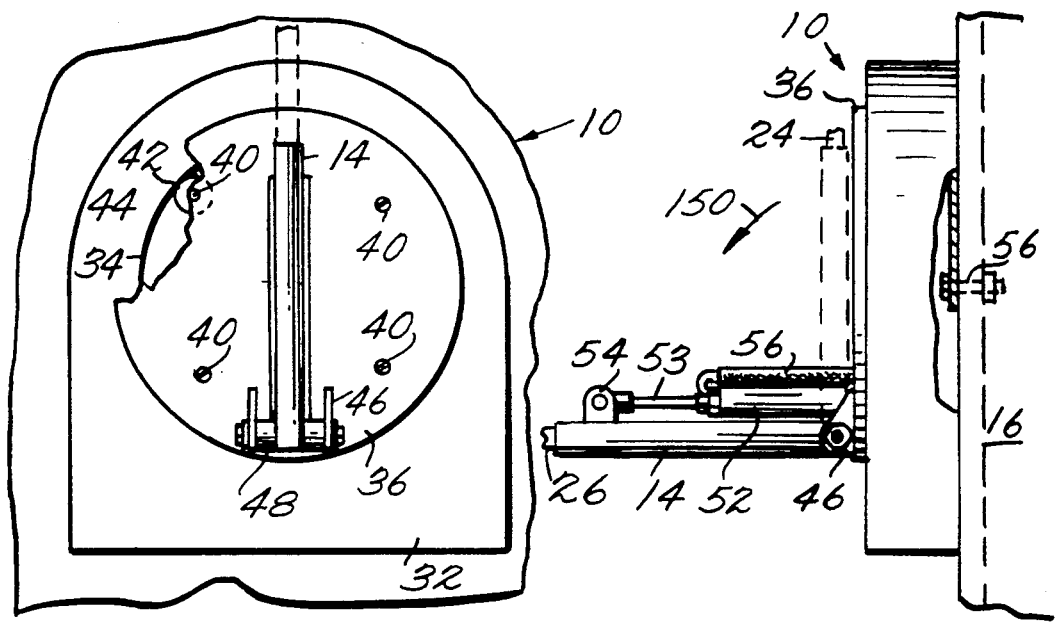
FIG. 3 is a front elevation of the outrigger rotating disc mechanism.
FIG. 4 is a side elevation view of the rotating disc mechanism of the invention.

With reference more specifically to FIG. 3, these bolts 40 each support a bearing means 42. The bearing means 42 facilitate the rotation of the rotating disc member 36 and the ring-shaped member 38 on surface 44 of either side of the face plate 32.

Fixedly attached to the outer rotating disc member 36 is a female bracket 46. Female bracket 46 receives the butt end of tubular mounting insert 14. The mounting insert 14 has a T-bar end 48 which provides a point of pivoting when received in female bracket 46. The tubular hollow insert 14 slidably receives the butt end of the pole 12. Accordingly, the mounting insert 14 and the pole 12 will act in unison during movement of the rotating disc mechanism 10.

The bracket 46 and the T-bar end 48 are mounted and located near the outer periphery of outer rotating disc member 36. The tubular insert 14 will pivot to a position parallel with the rotating disc member 36 such that the tubular insert 14 will intersect the central axis of the aperture 34, disc member 36 and ring-shaped member 38. Furthermore, the tubular insert 14 is capable of pivoting from the parallel position such that tubular insert 14 will be perpendicular to the plane formed by face plate 32 and parallel with the central axis of the axially aligned members.

Figure 6:
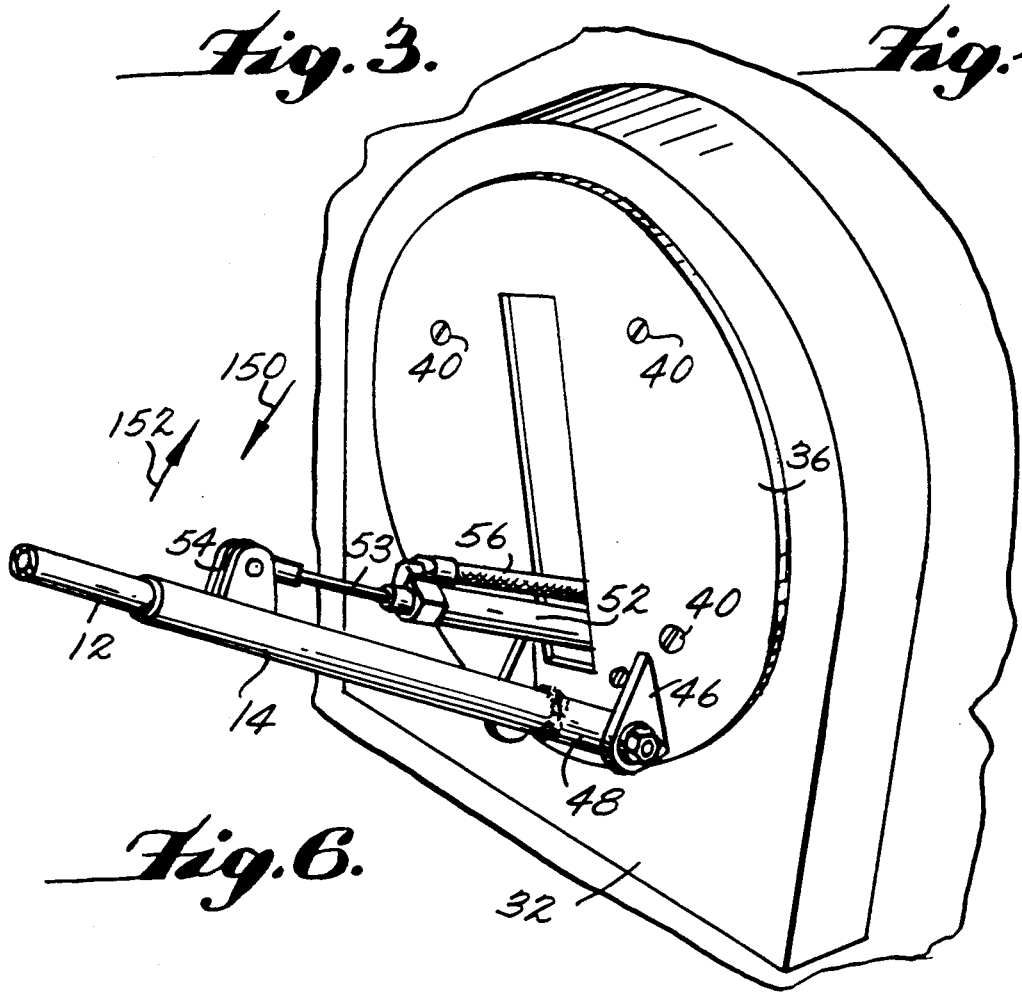
FIG. 6 is a perspective view of the rotating disc mechanism of the invention.

With reference now to FIGS. 4, 5 and 6, the connected disc member 36 includes a rectangular cut-out 50. This cut-out 50 extends along the diameter of disc member 36 and is in axial alignment with aperture 34 as well as ring-shaped member 38. The cut-out 50 is positioned to form a right angle with tubular insert 14 when the insert is perpendicular to the disc member 36 and completely covered by the insert 14 when the insert is in the position parallel to the face plate 36.

This cut-out 50 permits in/out hydraulic ram 52 to extend through and retreat into the rotating disc mechanism 10. The in/out ram 52 has an extending and retracting piston rod 53 which is pivotally attached to the mounting insert 14 by way of female bracket and pin retainer means 54. Part of the in/out hydraulic ram component 52 includes a hydraulic flow tube 56 for controlling the movement of the piston rod 53 of the ram 52 so the outrigger pole 12 and mounting insert 14 move fluidly from the in or stowed position 22 to the out or fully extended position 28.

As shown in FIG. 4, the outrigger disc mechanism 10 is flush mounted by securing means 56 to the side of the super structure 16 of the boat 18. The superstructure can be any structure of the boat such as the hull, tower, fly bridge or other contemplated positions.

FIG. 5 illustrates a rear perspective view of the disc mechanism 10. From this view, mechanism 10 is shown to include a side plate 58 and bottom plate 60 as well as a flush mounting back plate 62. The flush mounting back plate 62 includes a plurality of flush mounting means 64 to receive the securing means 56.

The in/out hydraulic ram 52 is securely and pivotally attached to the inner ring-shaped disc 38 by way of a female bracket and pin retaining means 68. The piston 53 of the ram 52 is rotatably attached to mounting insert 14. It will be noted at this time that the hydraulic flow tubes are not shown in this particular view for sake of clarity. The tubes are attached to inlet/outlet ports 70, 72, 74 and 76.

Aft/fore or rotating hydraulic ram 78 controls the rotational features of the disc mechanism 10 and, more specifically, the movement of the outrigger pole 12 from the stowed position 22 to the vertical position 24 and vice versa as illustrated in FIG. 1. This aft/fore hydraulic ram 78 includes piston rod 79 which is movably and pivotally attached to the inner ring-shaped rotating disc 38 by post means 80. The other end of the ram 78 is securely as well as pivotally mounted to the inside face 82 of the face plate 32 by way of pivot post means 84.

Figure 7:
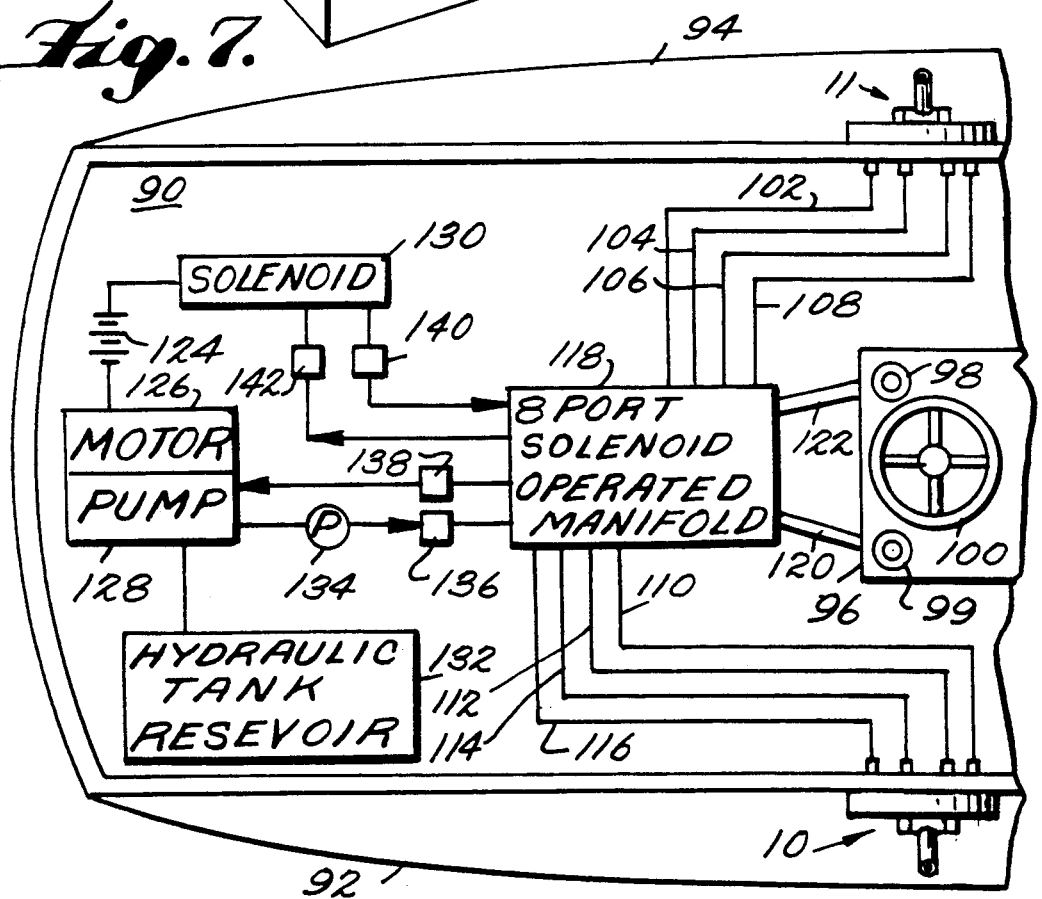
FIG. 7 is an electro-hydraulic block diagram of the outrigger control system in accordance with the present invention.

FIG. 7 illustrates the outrigger control system 90. As shown, one rotating disc mechanism 10 is mounted to the starboard side 92 and the other mechanism 11 is mounted to the port side 94 of the boat 18. A control console 96 includes a pair of joysticks 98, 99. These joysticks are input means or devices which are utilized to input control signals for direction of movement for the starboard side 92 rotating disc mechanism 10 or to input control signals for direction of movement for the port side 94 rotating disc mechanism 11, respectively. The steering wheel 100 controls the movement of the boat 18, as is commonly known.

As previously noted, the hydraulic rams 52, 78, each include two pairs of inlet/outlet ports. These ports are connected to respective hydraulic flow lines 102, 104, 106 and 108 for the port side 94, and 110, 112, 114 and 116 for the starboard side 92. These flow lines enter into an eight port solenoid operated manifold 118 which includes a plurality of flow actuators that control the flow of hydraulic fluid. The joysticks 98, 99 are connected to the manifold 118 by way of a five strand conduit wire 120, 122. A battery 124 powers the motor 126 and pump 128 as well as the solenoid 130. A hydraulic tank reservoir 132 stores the hydraulic fluid for the system and a pressure gauge 134 provides a visual inspection means to ensure adequate pressure is maintained throughout the flow lines. A pair of flow regulators 136, 138 are added for smoothness of operation. Also, a pair of diodes 140, 142 are located between the pump solenoid 130 and the manifold 118 to prevent any malfunctions during the movement of outrigger pole 12 to a position. In case of solenoid failure, the diodes 140, 142 prevent hydraulic lock on the starboard or the port systems. Hydraulic lock will occur when two solenoids open at the same time and thus work against each other.

In operation, when the unit is turned on, the power from the battery 124 is directed to the solenoid 130 when the appropriate joystick 98, 99 is activated to the fore, aft, in, or out positions. The current opens the selected solenoid which allows fluid to flow for operating the hydraulic rams 52, 78. The rams 52, 78 then move the outrigger rotating disk mechanism 10 and thus the outrigger pole 14 to a chosen position.

As power from battery 124 turns "on" the system. The pump 128 sends fluid from reservoir 132 through the manifold 118. The manifold then directs fluid into the respective flow lines and up to the inlet/outlet ports of the hydraulic rams for both rotating disc mechanisms 10, 11. The manifold 118 has a plurality of actuators which open and close the ports like switches based on the command control signals received from the joysticks 98, 99. By viewing pressure gauge 134, the operator has an indication when adequate and sufficient pressure is in the lines for operation. To position the outrigger pole 12, a combination of movements are required by the hydraulic rams. These movements are selected and controlled easily by the operator from the movement of the joysticks 98, 99. The operator can raise or lower an outrigger pole 12 or bring the pole fore and aft in fluid and unencumbered movement by utilizing the joysticks 98, 99.

With reference to FIG. 5, the stowed position 22 of the rams 52, 78 is illustrated. In this position, fluid is fed into port 76 of ram 78. This fluid forces piston rod 79 to slide out of the ram. The force on post 80 causes a pivotal movement or clockwise rotation of attached disc members 36, 38 as indicated by directional arrow 146. During this time, fluid has been removed from ram 52. This extension of piston rod 79 will directly rotate the tubular insert 14 about the central axis which axially aligns the members. The turning function moves the outrigger pole 12. Accordingly, the pole 12 is now in the stowed position 22.

Alternatively, to move from stowed position 22 to complete vertical position 24, the operator moves the joysticks which signal the manifold 118 to send fluid to port 74 and retract fluid through port 76. The pump 128 maintains the flow of the fluid into and out of the manifold 118. With the actuators of the solenoid in the manifold 118 acting as switches, fluid enters the respective flow line and ram. Pressurized fluid flows to the ram 78 and the piston rod 79 slides into the ram 78 when this fluid is fed into inlet/outlet port 74. The piston rod pulls on post 80 as it retracts which causes the disc members 36, 38 to rotate in a counterclockwise direction as indicated by arrow 148. The retraction of position rod 79 will directly result in the turning of tubular insert 14 about the central axis. The rotational function moves outrigger pole 12 from the stowed position 22 to the complete vertical position 24. Accordingly, the disc rotating mechanism is in the complete vertical position as shown in FIGS. 1 and 3.

The operation of hydraulic ram 52 will now be discussed with reference to FIGS. 4 and 6. To move the mounting insert 14 from the complete vertical position 24 to the fully extend position 26, the operator again moves the joystick to the respective selected position. The joystick 99, acting as an input device, signals the manifold 118 to open the respective flow line. The fluid is pumped by the pump 128 to the manifold 118 which in turn sends the fluid to ram 52. The fluid is fed into ram 52 through port 70 and fluid is drawn or drained from ram 52 by way of port 72. The drained fluid returns to the manifold 118 and back to the pump 128. The fluid is then stored for future use in the reservoir 132. As fluid forces the piston rod 53 out of the ram, so to extend through the rectangular cut-out 50 of the disc member, the piston rod applies a force on female bracket 54 of the mounting insert 14. This force causes the mounting insert 14 to move downwardly or away from the vertical position 24 to the extended position 26 as indicated by direction arrow 150 in FIGS. 4 and 6. More specifically, the tubular insert 14 pivots about the face plate 32 to a position now perpendicular to the face plate 32.

Alternatively, to move the mounting insert 14 from the fully extended position 26 or the perpendicular position with respect to the face plate 32, fluid is fed into ram 52 by way of port 72 and forced out of ram 52 through port 70. As fluid enters the ram, piston rod 53 is forced back or retracts through the rectangular cut-out 50 of the disc member 36 and into the ram 52. This causes a pulling force on bracket 54 which raises the mounting insert 14 and the inserted pole 12 to the vertical as indicated by numeral 152. In other words, the tubular insert 14 pivots about the point defined by bracket 46 and T-bar 48. This pivoting function moves tubular insert 14 from position perpendicular with the disc member 36 to a position parallel to the disc member and covering the rectangular cut-out 50.

By way of the joysticks 98, 99, the operator enjoys a very fluid control of the outrigger pole 12. The pole can be easily raised or lowered and moved fore or aft by an operator of almost any age. The joysticks 98, 99 operate as input means. They send a single representing the desired position of the pole in the form of a control signal to move the pole by way of the disc mechanism 10 to any of the previous mentioned positions 22, 24 or 26 as well as any position therebetween such as generally indicated by numeral 28 in FIG. 1 and numeral 30 in FIG. 2.

While this description contains many specificities, these should not be constructed as limitations on the scope of the invention, but rather as an exemplification of one preferred embodiment thereof. Many other variations are possible. For example, instead of fluid one could utilize air. Also, rather than using joysticks, push buttons could be used and the pressure gauge could easily by some sort of light indicator. Furthermore, the shape of the mechanism 10 is somewhat arbitrary and only requires a circular shaped center or otherwise similar shape to allow for the rotational characteristics. Thus, the outer shape is merely decorative and any circle, diamond or square shape could be utilized. For that matter, it is not necessary to use a bearing means because the disc member and ring-shaped member are capable of rotating on the ride surface. Also, it is possible to flush mount the mechanism with the hydraulic system recessed in the cabin or the fly bridge. Accordingly, the scope of invention should be determined not by the embodiment illustrated, but by the appending claims and their equivalents.

I claim:

1. A control system for outrigger sport fishing, comprising:
   a rotating outrigger mechanism having a centrally positioned aperture;
   a tubular member pivotally and rotatably attached at one end to said outrigger mechanism near said centrally positioned aperture;
   means for moving said tubular member about the pivotally attached end from a position perpendicular to said centrally positioned aperture to a position parallel to said centrally positioned aperture as well as any position therebetween;
   means for rotating said tubular member about said centrally positioned aperture; and
   circuit means for electrically controlling said outrigger mechanism by supplying control signals to said moving means and said rotating means, said circuit means controlling the pivotal position of said tubular member through said moving means and said circuit means controlling the rotational position of said tubular member through said rotating means.

2. The control system of claim 1, comprising:
   input/output means having at least one input and a plurality of outputs for switching said moving means and said rotating means based on the control signals from said circuit means.

3. The control system of claim 2 comprising:
   said at least one input is electrically connected to said input/output means for providing a direction signal to said circuit means.

4. The control system of claim 3, wherein said at least one input includes a joystick.

5. The control system of claim 3, wherein said at least one input includes at least one push button.

6. A control system for outrigger sport fishing, comprising:
   an outrigger mechanism including a face plate covering said outrigger mechanism and said face plate having an aperture;
   an outer member having a centrally positioned cut-out, said outer member of sufficient size to rotatably cover said aperture with said cut-out and said aperture axially aligned;
   an inner member having a centrally positioned opening, said inner member of sufficient size to rotatably cover said aperture and fixedly attached to said outer member with said aperture of said face plate axially positioned between said centrally positioned cut-out and said centrally positioned opening;
   a tubular member pivotally attached at one end to said outer member near said cut-out, said tubular member pivotally moving from a position perpendicular to said cut-out to a position in parallel with said cut-out as well as any position therebetween;
   a first ram movably attached to said inner member and to said tubular member for moving said tubular member about the pivotally attached end to the perpendicular position by extending through said axially aligned cut-out and for moving said tubular member to the parallel position by retracting through said axially aligned cut-out;
   a second ram rotatably connected to said face plate on the same side of said inner member and rotatably connected to said inner member near said movably attached first ram, said second ram extending perpendicularly to the central axis of alignment to turn said tubular member counter-clockwise and retracting perpendicularly to the central axis of alignment to turn said tubular member clockwise; and
   electro-pressure circuit for electrically supplying pressure to at least one of said rams.

7. The control system of claim 6, wherein said electro-pressure circuit includes:
   means for inputting control signals representing movement positions of said tubular member.

8. The control system of claim 7, wherein said electro-pressure circuit includes:
   input/output means having a plurality of ports for receiving said control signals from said input means and directing at least one of said rams to move said tubular member in compliance with said control signals.

9. The control system of claim 7, wherein said input means includes at least one joystick.

10. The control system of claim 8, wherein said electro-pressure circuit supplies fluid to said input/output means as well as electrical power.

11. The control system of claim 8 wherein said electro-pressure circuit supplies air to said input/output means as well as electrical power.

12. A control system for outrigger sport fishing comprising:
   an outrigger mechanism;
   a face plate covering said outrigger mechanism and having a centrally aligned circuit aperture;
   an outer circular disc having a diameter positioned rectangular cut-out, said outer circular disc of sufficient size to rotatably cover said centrally aligned circular aperture of said face plate,
   an inner ring-shaped member fixedly attached to said outer circular disc with said centrally aligned circular aperture of said face plate axially positioned therebetween;
   a tubular member having a T-shaped portion pivotally attached to said outer circular disc, said tubular member pivotally moving from a position perpendicular to said rectangular cut-out to a position in parallel with said rectangular cut-out as well as any position therebetween;
   an in/out hydraulic ram including a piston rod, said in/out hydraulic ram movably attached to said inner ring-shaped member and said piston rod movably attached to said tubular member, said in/out hydraulic ram moving said tubular member to the perpendicular position by extending said piston rod through said rectangular cut-out and moving said tubular member to the parallel position by retracting said piston rod through said rectangular cut-out;
   a rotating hydraulic ram including a piston rod, said rotating hydraulic ram rotatably connected to said face plate on the same side as said inner ring-shaped member and said piston rod rotatably connected to said inner ring-shaped member near said movably attached in/out hydraulic ram, said rotating hydraulic ram turning said tubular member in a counter clockwise direction by extending said piston rod and turning said tubular member in a clockwise direction by retracting said piston rod; and
   electro-hydraulic circuit means for electrically supplying hydraulic pressure to said in/out ram for moving said tubular member and electrically supplying hydraulic pressure to said rotating ram for turning said tubular member.

13. The control system of claim 12, wherein said electro-hydraulic circuit means includes;
   means for inputting control signals representing the direction of movement for said tubular member as applied by at least one of said rams.

14. The control system of claim 12, wherein said electro-hydraulic circuit means includes:
   input/output means having a plurality of ports connected to said input means for receiving said control signals and said hydraulic pressure, said input/output means directing said hydraulic pressure to at least one of said rams based on the received indication represented by said control signals.

15. The control system of claim 13, wherein said input means includes at least one joystick.

16. The control system of claim 13, wherein said input means includes at least one push button.

17. The control system of claim 14, wherein said supplied pressure includes fluid.

18. The control system of claim 14, wherein said input/output means includes a solenoid operated manifold having a plurality of actuators for switching the supplied hydraulic pressure from said electro-hydraulic circuit means to said rams, and for switching the supplied hydraulic pressure from said rams to said electro-hydraulic circuit means.

* * * * *